US011158295B2

(12) United States Patent
Rein et al.

(10) Patent No.: US 11,158,295 B2
(45) Date of Patent: Oct. 26, 2021

(54) SYSTEM AND METHOD FOR AI CONTROLLED SONG CONSTRUCTION

(71) Applicant: BELLEVUE INVESTMENTS GMBH & CO. KGAA, Berlin (DE)

(72) Inventors: Dieter Rein, Berlin (DE); Jurgen Jaron, Berlin (DE)

(73) Assignee: BELLEVUE INVESTMENTS GMBH & CO. KGAA

(*) Notice: Subject to any disclaimer, the term of this patent is extended or adjusted under 35 U.S.C. 154(b) by 0 days.

(21) Appl. No.: 16/912,867

(22) Filed: Jun. 26, 2020

(65) Prior Publication Data

US 2020/0357370 A1    Nov. 12, 2020

Related U.S. Application Data

(63) Continuation-in-part of application No. 16/869,334, filed on May 7, 2020.

(51) Int. Cl.
*G10H 1/00* (2006.01)
*G06N 20/00* (2019.01)
*G06K 9/62* (2006.01)
*G06F 16/635* (2019.01)

(52) U.S. Cl.
CPC ......... *G10H 1/0025* (2013.01); *G06F 16/635* (2019.01); *G06K 9/6256* (2013.01); *G06N 20/00* (2019.01); *G10H 2210/036* (2013.01); *G10H 2210/111* (2013.01); *G10H 2210/151* (2013.01)

(58) Field of Classification Search
CPC ........... G10H 1/0025; G10H 2210/036; G10H 2210/076; G10H 2210/111; G10H 2210/121; G10H 2210/151; G06N 20/00; G06F 16/635; G06K 9/6256
See application file for complete search history.

(56) References Cited

U.S. PATENT DOCUMENTS

| 7,754,959 | B2* | 7/2010 | Herberger | G11B 27/24 84/626 |
| 10,854,180 | B2* | 12/2020 | Silverstein | G10L 25/15 |
| 2010/0162879 | A1* | 7/2010 | Marcus | G10H 1/0025 84/609 |
| 2016/0372095 | A1* | 12/2016 | Lyske | A63B 69/00 |
| 2020/0380940 | A1* | 12/2020 | Abdallah | G06N 7/005 |

* cited by examiner

*Primary Examiner* — Fan S Tsang
*Assistant Examiner* — David Siegel
(74) *Attorney, Agent, or Firm* — Fellers, Snider, Blankenship, Bailey & Tippens, P.C.; Terry L. Watt (57) ABSTRACT

According to an embodiment, there is provided a system and method for automatically generating a complete music work from a partially completed work provided by a user. One approach uses an artificial intelligence (AI) engine that is trained by creating incomplete works from a database of complete works and then instructing the AI to complete the incomplete works. A comparison is made between the completed works and the originals to determine the effectiveness of the training process. After the AI is trained, it is applied to the user's incomplete work to produce a final music item.

10 Claims, 4 Drawing Sheets

SYSTEM AND METHOD FOR AI CONTROLLED SONG CONSTRUCTION

CROSS REFERENCE TO RELATED APPLICATIONS

This application is a continuation-in-part of co-pending U.S. patent application Ser. No. 16/869,334, filed May 7, 2020, which application claims priority to U.S. Provisional Patent Application Ser. No. 62/844,171, filed May 5, 2019, and incorporates said applications by reference into this document as if fully set out at this point.

TECHNICAL FIELD

This disclosure relates generally to methods of editing and generating audio content and, in more particular, to methods of utilizing a machine learning AI system for an automatic audio loop based song construction.

BACKGROUND

Music and song generation have been a goal and dream of many people for as long as music has been around. However due a lack of knowledge of the details regarding music styles or music making in general, generating/writing music has become the privilege of people having the requisite knowledge and education. With the advent of the personal computer and the widespread adoption of these devices in the home consumer market, software products became available that relieved the user from having to know the particulars of, for example measure, music structure (bars, measures, tracks, etc.), notation, key, time signatures, harmony, etc. These software products provided graphical user interfaces offering a new visualization approach to generating and editing music content therewith providing a plurality of users' easy access to the concept of music generation. Incidentally, with these software products the provision of content available for the generation of music to the user also evolved and received enhancements. A multitude of separate singular sound clips—so-called audio loops—were created and provided to the user as building blocks for the music creation process.

With the release of these types of software products, the process of music or song generation came into reach for a host of new users, who then took advantage of these simplified approaches to music generation. Over the years, these software products have evolved, gotten more sophisticated, more specialized, and even appeared on mobile devices. However the general approach to music generation has stayed more or less the same—selection and arrangement of audio loops representing instruments (e.g., drums, bass, guitar, synthesizer, vocals, etc.) to generate individual parts or tracks of a music item with a preferred length of 2, 4 or 8 measures, wherein the generated parts of the music item are played together to yield a complete music item. Most users are able to generate at least one or two parts of a music item with the help of software that might be installed on either a mobile device or a desktop computer. Therefore, the generation of at least part of a music item, such as a verse or refrain, has become a possibility for many casual users.

However in some instances in order to sound like a conventionally prepared piece of music, the piece should be longer than just a few measures, e.g., at least consist of at least two or more minutes of playtime, and contain a plurality of (e.g., up to 16) individual parts in order to feel and sound like a real music composition. The desire requirement—to generate that many parts and arrange them with each other to generate an acceptable music piece requires patience, enthusiasm, and the necessary eye and especially ear for detail. These requirements exceed the capabilities of most users and very often, the user will eventually capitulate during the generation process and end it prematurely, so that the resulting fragment of such a composition is too short or musically unsatisfying—in the end bringing about a fragmented music piece.

Therefore, since it is not unusual for the creative side of the process to hit a dead end, this can eventually lead to disappointment and ultimately abandonment of the software product by the user. Of course, having a user leave a music piece project without completing it and ultimately abandoning it is not desirable from a business standpoint. The workflow of the software should not be interrupted or stopped because the generation process is too hard for the user. The process should result in musically pleasing music pieces, which in a potentially associated online community are assessed, valued and potentially liked, thereby making sure that the user of the software product is satisfied with the music piece in general and additionally with the public response and in the end continues to use the software product.

Thus, what is needed is a method for supporting a user when generating music pieces with an audio loop based music generating approach. The instant invention provides a trained AI ("artificial intelligence") system as a supplemental system to the audio loop based music generation wherein the AI system is tasked with suggesting, provisioning and selecting suitable audio loops based on an initial input of audio material from the user resulting in a music piece being generated and representing a musically sound result.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment there is provided a system and method for utilization of a machine learning AI system for automatic loop based music construction. In one embodiment, the instant invention provides a music piece generation process utilizing an AI system that is initialized upon provision of user created, provided, or selected audio material and implements analysis data from the user's audio material and the contents of an associated audio loops database. The AI system also incorporates an initial dataset that has been generated from a learning phase based on the musical content of a database of available complete music items.

It should be clear that an approach such as this would be a tremendous benefit to the user and could additionally represent a tremendous step forward in the development of music pieces. An improvement such as this has the potential to alleviate much of the tedious and wearisome effort associated with manually generating complete music pieces from audio loops and replacing much of that effort with software assistance that utilizes a trained machine learning AI system. The knowledge base of the AI system may include information such as an analysis of the auditory properties of user generated audio loops, an analysis of the contents of a database of audio loops that are organized in various loop packs and, additionally, data from a database containing a plurality of curated complete music pieces.

Therefore, this approach finally delivers functionality to the user of music creation programs that will make it possible for a user to begin and complete a music generation process in a satisfactory manner. The provision and selection of audio loops is initially based on the auditory properties of the loops provided and those created by the user. These loops will be utilized by a trained machine learning AI system. Loops will be suggested to the user based on an analysis of the complete audio loop database and will not be limited by loop pack (i.e., a loop pack being a collection of audio loops that are associated with a specific category, e.g., genre, or instrument). This may result in audio loop suggestions to the user that he or she never would have thought to choose. As a consequence, the variety of a generated music piece could potentially benefit extraordinarily from loops drawn from outside of the normal source.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

While this invention is susceptible of embodiments in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Figure 1:
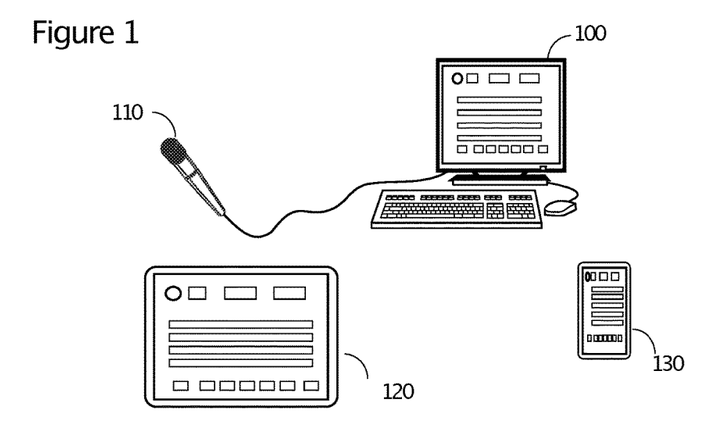
FIG. 1 is an illustration of the working environment of the instant invention.

As is generally indicated in FIG. 1, at least a portion of the instant invention will be implemented in form of software running on a user's computer 100. Such a computer will have some amount of program memory and storage (whether internal or accessible via a network) as is conventionally utilized by such units. Additionally, a microphone 130 might be utilized so that the user can add voice-over narration to the multimedia work and record audio material for later insertion into a music item. Additionally, it might also be possible and is shown in FIG. 1 that the process of the instant invention might be implemented on portable tablet computer devices 140 or on other mobile devices, such as smart phones 150.

Figure 2:
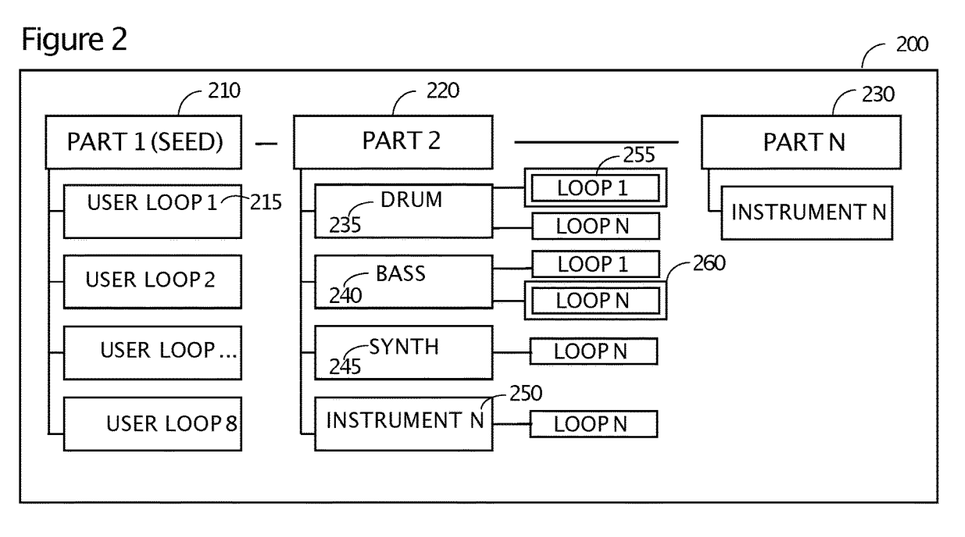
FIG. 2 is depicting the general and basic structure of a song or music piece according to the instant invention.

Turning next to FIG. 2, this figure illustrates one possible structure or organization of a music item 200 according to an embodiment. Note that for purposes of the instant disclosure, the audio that is to be produced by the instant method will be referred to as a "music item", hereinafter.

This embodiment functions as the starting point for the music item generation process of the instant invention and represents a generic framework for a music item. According to this approach a generated complete music item is comprised of a plurality of individual song parts, illustrated by part 1 210, part 2 220 and Part N 230, where the choice of "N" for the last part 230 indicates that a complete song or music item consists of an arbitrary number of parts, "N". Each of these parts will have an associated runtime, which might be defined by the user or defined as being, for example, 4 or 8 measures, etc. Further, each part might be characterized as being, for example suitable for use as an intro, ending, turnaround, bridge, etc. FIG. 2 also illustrates that each part of a music item might include an arbitrary number of audio loops which in some embodiments might be instruments. If a loop contains an actual or synthesized instrument it will typically be a repeatable section of audio material as is well known to those of ordinary skill in the art.

Part 1 210, the seed part, is generated by the user after selecting a plurality of user created audio loops 215, audio loops that are not a part of the audio loops database. The user generates a user audio loop set and therewith seed part. Note that it is not required by the user to fill all the 1 to 8 slots for audio loops, it should be noted that this number has been selected for illustrative reasons, wherein it is required that the user provides at least one audio loop, with more audio loops raising the quality of the potential output music item.

In FIG. 2 the instruments depicted, drums 235, bass 240 and synth 245, are provided as examples and are not meant to limit the specification to only these instrument choices. It should be clear that any arbitrary choice of an instrument is possible, where "instrument" includes traditional instruments as well as percussion instruments such as toms, snares, base drums, etc. For each of the available instruments at least one audio loop 255 at a time will be selectable 260 and will be played when the playhead in a multitrack music item is moving through that song part, with all instruments that share that particular playback time being played simultaneously. The decision as to which audio loop will be selected to complete a music item will be chosen automatically by utilizing a machine learning AI system as discussed below.

By way of further explanation, the instruments 235, 240, 245, and 250 in the example of FIG. 2 are all potentially played simultaneously, e.g., each instrument can be thought of as occupying a different track in a multi-track digital music item. The loops associated with the same instrument 255 will typically be played sequentially, e.g., Drum Loop 1 could be followed by Drum Loop 2, etc., with the understanding that each of the loops might be repeated so that Drum Loop 1 might be repeated for several measures, whereas the Bass Part (track) might alternate between Bass Loop 1 and Bass Loop 2 over the same measures. Note that Loop 1 need not be played before Loop 2 but they can occur in any temporal order. Further, in some embodiments a song part might contain intervals where, for example, the Synth track is silent, and the other tracks continue to play. This sort of arrangement is well known to those of ordinary skill in the art.

As was explained above, in some embodiments the audio loop that has been selected will be played continuously (looped) during the runtime of a single part, or during the playback of all of the parts. In some variations it will be possible for the user to select and de-select or switch between individual loops of the instruments during the runtime of a particular part.

One embodiment utilizes an evolving and growing database of audio loops for the generation and completion of the music item, where the audio loops are categorized according to particular instruments and organized in loop packs. These loop packs can represent specific music styles for example EDM, 50s, Drum'n Bass and House, however there could be other categories that might be used to organize the audio loops. Each individual loop pack features a plurality of different instruments and associated audio loops. In some embodiments, this database of audio loops will be updated on a regular basis with new loop packs, wherein these updates are preferably being delivered over the Internet for free or in exchange for a particular payment option.

Figure 3:
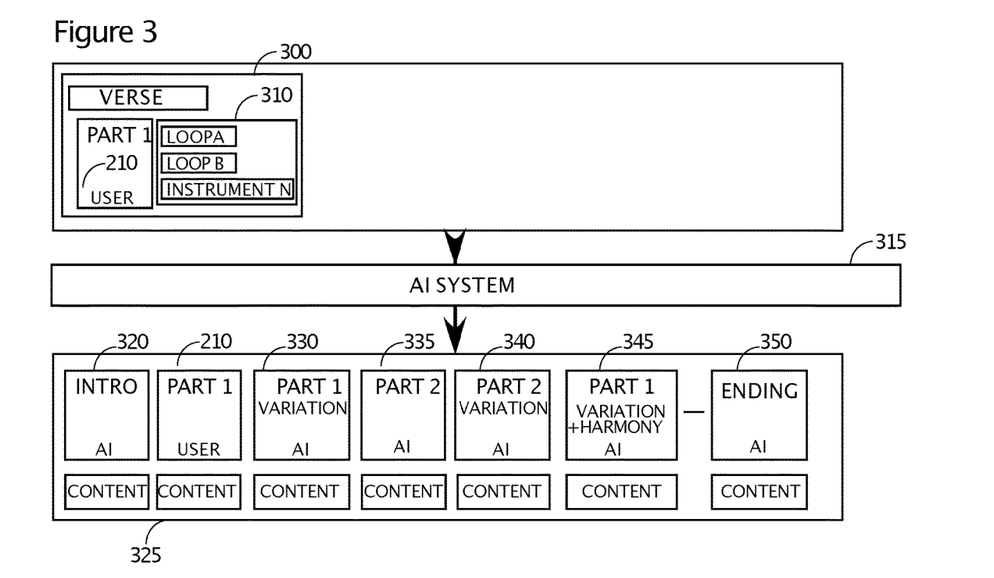
FIG. 3 is illustrating the interaction of the components of the instant invention in a compressed form.

Turning next to the embodiment of FIG. 3, this figure illustrates the interaction of the components of the instant invention in a compressed form. In most cases the instant invention will start with an incomplete song or music item, comprised of at least one seed song part 210, for example a verse 300, generated and provided with content 310, preferably audio loops created by the user. This fragment of a music item will be analysed by the AI system 315, which will sequentially process the fragment and, after processing, generate a completed music item 325 for review by the user. This completed music item will preferably consist of a proper intro 320 and ending part 350, the user generated initial music item fragment 210 and a plurality of additional song parts that have been generated by the AI system. The AI system generates and positions new song parts 335 or defines variations of the initial existing seed song part 1 330. The system taught herein therefore potentially will be able to define the structure of the entire music item as well as the contents of the music item given only one seed music item fragment (song part) as a starting point.

Figure 4:
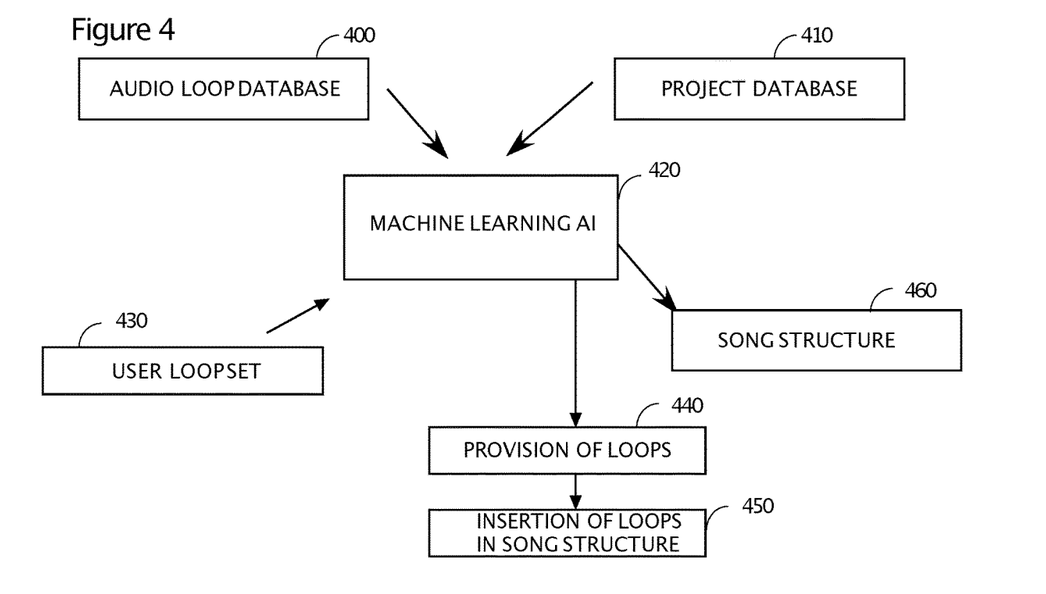
FIG. 4 is depicting the functionality of the machine learning AI system of the instant invention.

Turning next to FIG. 4, this embodiment depicts the functionality of the machine learning AI system 420 in connection with the available data sources. The system for machine-based learning constantly monitors the content of a database of audio loops 400 that is being provided to the AI system, where "constantly monitors" means that with new content being added to the database of audio loops regularly, the AI system evaluates and analyses new additions of audio loops and adds the analysis results to the accumulated knowledge of the AI.

The ongoing monitoring process will be automatically enabled after an initial analysis of the complete audio loop database by the AI system. After this initial analysis, the AI system will have accumulated knowledge about every audio loop in the database for use during the construction of the music items. Among the sorts of information available for each loop are its auditory properties (e.g., frequency content/properties, tempo, key, length in measures and/or time, etc.) and affiliation with a particular loop pack (e.g., music genre) and instrument. With this information available for utilization, this embodiment provides the user with a wider bandwidth of audio loop selection that might extend beyond the confines of a particular loop pack affiliation. Additionally the AI system will also be able to work globally if so indicated by the user, i.e., the AI system will provide loop suggestions that might not be contained in a locally stored variant of the audio loop database but, instead, might be contained in a remote database accessible via the Internet. If this option is selected, the completed music item will be provided to the user along with a notice of which of the inserted audio loops are stored in the local database and which audio loops are stored in a remote database and, in some cases, would have to be purchased.

The content of the audio loop database 400 will be analysed by an algorithm which provides a plurality of data values for around 200 of fundamental/low level parameters of an audio loop including, for example, volume, loudness, FFT (e.g., the frequency content of the loop or sound based on its fast Fourier transform and/or its frequency spectrum) etc. In one preferred embodiment, a further computation (e.g., principal component analysis ("PCA"), linear discriminant analysis ("LDA"), etc.) will be performed on the fundamental/low parameters to reduce their dimensionality. Methods of reducing dimensionality using algorithms such as PCA and LDA in a way to maximize the amount of information that is captured in the reduced dimensionality space are well known to those of ordinary skill in the art. The resulting summary parameters, which in some embodiments might comprise at least eight or so reduced dimensionality parameters, will be used going forward. These summary parameters might include one that corresponds to the instrument(s) that are predominant in each loop. For purposes of the instant disclosure, the discussion will go forward assuming that the summary parameter count is at least "8", although those of ordinary skill in the art will recognize that a fewer or a greater number of parameters might be used depending on the situation.

Continuing with the present example, with these eight parameters the instant invention can generate an 8-dimensional mapping of each audio loop; as a result, musically similar loops are will be positioned near each other in 8D space. The data values of these eight parameters might be stored in one database file for each audio loop and utilized by the machine learning AI as part of the process of an embodiment of the instant invention. Additionally the instant invention might provide the machine learning AI system with the contents of a project database 410—where "project" means pre-generated, preferably complete, music items. In some embodiments the project database 410 might be a centralized database which is accessible to other users. In some cases, in addition to being able to read from this database, multiple users might be able to store their own multimedia projects (preferably completed ones) there as well. The preferred structural layout of each project will comprise at least 16 song parts with at least eight channels or tracks.

The data from the audio loop database 400 and the project database 410, if it is utilized, will be fed into the machine learning AI system to allow it to be trained. The training process of the machine learning AI system will also be an ongoing and continuous process. Both the loop database as well as the project database will be "living" databases where audio loops or projects can be added, deleted, or changed in an ongoing manner, which will result in a training process that is also an ongoing "living" process.

The music item creation process utilizing the machine learning AI system will be set into operation as soon as a data foundation has been set, one that allows the AI system to generate the music items with a high confidence. In one embodiment, the audio analysis ultimately provides data values for at least eight individual parameters, as has been disclosed earlier, for each of the audio loops, which are provided to the machine learning AI system in one data file related to the audio loops.

The project database 410 in one embodiment might comprise of at least 200 k of projects or music items. In some embodiments, the database might only be accessible via the Internet and in other instances; it might be stored full or partially on the user's local disk. In either case, a new user will preferably find some number of song projects already stored there. These might be curated music items that have been professionally designed and evaluated before being stored in the database. In some cases, this database will be stored in a remote location and made to be accessible by multiple users so that any number of individual user projects might be stored therein along with the curated music items. In the latter case, since there might be users who start and never finish a project, or are currently working on an unfinished project, there might be projects that would not be suitable for use in the steps that follow. One method for dealing with this possibility is discussed below in connection with an initiated "filtering" step.

The machine learning AI, which might be a deep learning "Generative Adversarial Net" ("GAN") as that term is known to those of ordinary skill in the art, will be given access to user loop sets 430 containing user provided audio loops unknown to the AI system. The machine learning AI will then process this user loop set 430, generate a proposed song structure 460 and additionally determines a collection of data values that represent desired audio loops for the generated song structure sections 440. The data value collection is preferably a list of numbers calculated or otherwise determined for each of the audio loops, preferably and according to the current example, the values will be the eight individual parameters summary parameters. In a preferred variation, the instant invention will utilize the sort of distance measure in 8D space discussed previously to search for and select the best fitting audio loops from the loop database. The selected loops will then be automatically inserted into the generated song structure to complete the output music item 450 and provide it to the user for approval or disapproval.

Figure 5:
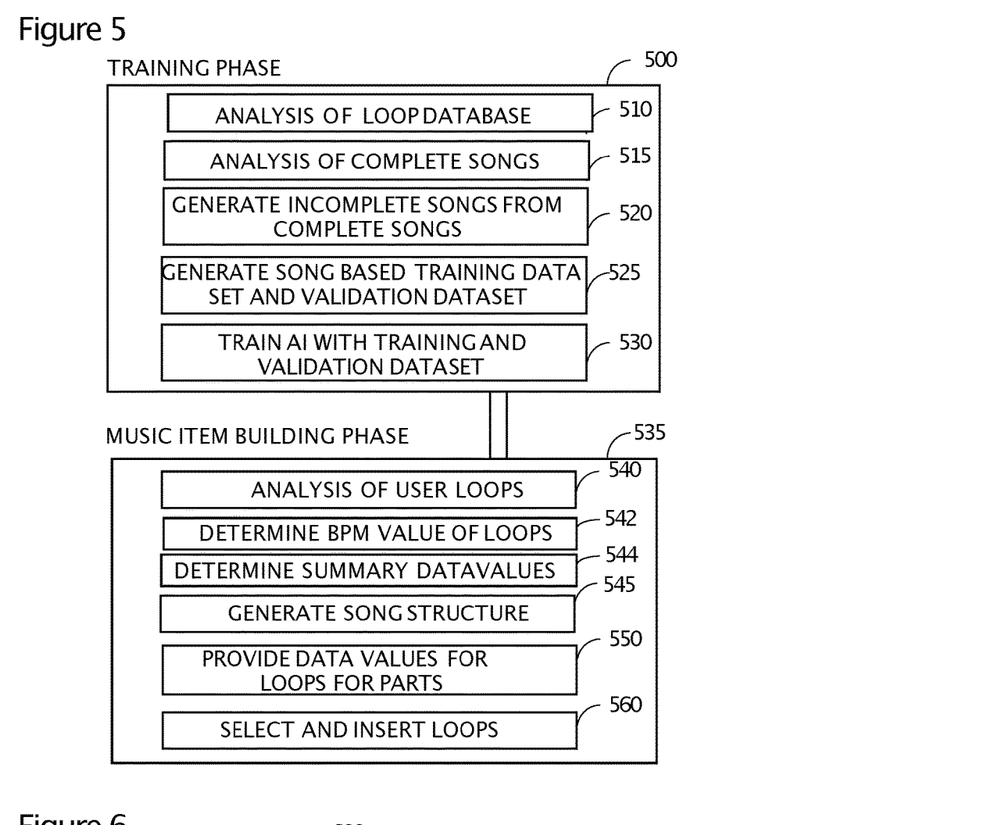
FIG. 5 is an illustration of a compressed form of the workflow of the instant invention.

Turning next to the embodiment of FIG. 5, this figure illustrates one workflow of the instant invention in a compressed form. This embodiment of a workflow discloses the training phase 500 and the music item building phase 535 of the instant invention. In a first preferred step of the training phase 500, the instant invention will analyze each audio loop stored in the loop database 510 to determine its audio parameters. In some embodiments, the analysis of each loop will yield data values for around 200 low level/fundamental audio parameters associated with each loop. These data values will then be composited into a smaller number of summary or fundamental parameters, e.g., by utilizing a PCA or LDA, etc., which will result in the current example to at least eight distinct features that describe a position of each audio loop in an eight dimensional space. The summary data values for each individual audio loop will then preferably be stored in a digital database, which might be a flat file, a hierarchical database, a relational database, etc. The file might be kept on magnetic or optical disk stored in volatile or non-volatile memory, etc. and will only be available for the AI system. As indicated previously, the analysis of the audio loops will be an ongoing process, which will be performed initially to process the audio loops stored in the audio loops database and, after the initial processing of the current content of the database, subsequently performed on each new audio loop as it is added to the loop database.

In a next preferred step, the instant invention will retrieve song projects/music items 515 from a song projects database and will carry out an analysis of these song projects. Before the start of the analysis, the song projects will be filtered to remove music items that may not be good material for training the AI system. For example, music items whose structure, and associated loop selection exhibit too much randomness will be automatically excluded. That is, if the selected loops in the song project are too different from each other or if the loops "flip" back and both between successive song parts, e.g., if the internal consistency between song parts is too low, there is a high probability that this music item is not a good fit for the AI step that follows. The filtering process might also remove music items that use the same loops repeatedly or that seem to use an excessive number of loops (e.g., the song might be rejected if it either uses too many different loops or too few). Additionally, the filter might remove songs projects that are too similar to each other so that no one song project is given excessive weight because it occurs multiple times in the database. Song projects that are not completed, e.g., that have empty tracks/parts, gaps in the tracks, etc., will also preferably be eliminated. The goal of the filtering process is to increase the probability that the remaining song projects provide a good dataset for use by the AI system in the training step that follows.

Note that for purposes of the instant disclosure, in some embodiments a complete song project/music item will comprise 16 song parts (e.g., measures, groups of measures, etc.) each of which contain at least eight individual audio channels/tracks, so in this embodiment the result of the analysis will generate a data collection of at least 16 song parts each with eight channels containing the audio loops, with each audio loop being represented by eight summary audio parameter values. The remaining song projects/music items constitute the pool, which will be used in the AI training phase that follows.

Each song project/music item in the training pool will then be converted to a (16 song parts)×(8 channels)×(8 summary parameters) data array to allow the GAN AI to process it. As has been mentioned previously, the choice of the number of audio parameter and song parts is well within the ability of one of ordinary skill in art at the time the invention was made and might vary depending on the particular circumstances and the 16×8×8 data array is a preferred example that is presented to make clearer one aspect of the instant invention.

As a next preferred step of the training phase, the instant invention will create incomplete song projects/music items 520 by extracting one or more song parts from the filtered complete song projects/music items with the incomplete song projects/music items at least containing one filled song part. Note that at least one song part must remain in the incomplete song project/music item so that it can be used in the steps that follow. That is, this step must extract fewer than all of the song parts that are in the music item.

The song parts that are retained (or those that are to be extracted) might be determined randomly or, in other cases instances, systematically (e.g., keeping every other song part, every third song part). In still other cases the song parts that are retained might correspond to a complete verse or a complete intro or a complete bridge, etc. Combinations of the foregoing are also possible. Those of ordinary skill in the art will understand how best to depopulate selected song parts of a completed song project in order to best suit a particular application. The complete song project/music piece and its incomplete counterpart are, for the training phase, arranged in pairs. As will be discussed further below, some of these incomplete song projects/music items will be used to train the AI and the remaining portion will be used to validate the training, which will be explained in the next step.

In this next preferred step, the training phase, the instant invention will generate a learning dataset and a validation dataset for which the pairs of complete and incomplete song projects/music items are split into two datasets, in some instances this might be done randomly, to create the datasets 525 needed in the next step. The split is preferably 90/10, with 90 percent of the complete/incomplete pairs utilized during the learning and 10 percent utilized by the validation part. Of course, that split is only given as an example and other divisions are possible and useable.

Next, and in some embodiments, the instant invention will automatically prepare the AI system for use with the learning and validation datasets 530. In the learning process the AI will be given the pairs of incomplete and complete song projects/music items, preferably 90 percent of the pool of filtered song projects/music items. By way of pairwise analysis of the incomplete and complete music items, the AI system will accumulate knowledge (data) about how the incomplete song projects/music items relate to their associated complete song projects/music items counterparts based at least in part on their structure, thereby training the AI system. The structure might include, for example, a determination of which audio loops had been selected and where they occurred within the completed song project/music item, etc.

During the learning phase an internal error value/error curve—which is an intrinsic part of an AI system—will fall off or decrease as the generated song projects/music items are compared against the completed song projects/music items, with the error curve providing an estimate on the quality of the learning process—not necessarily just its progress. In some embodiments this learning error value will be a guide as to when to stop training the AI system. That is, the training steps may be repeated until the learning error falls below some predetermined value. Those of ordinary skill in the AI arts will recognize how this particular parameter can be used to control the quality of the trained system.

The functionality of the trained AI will then be validated using the validation data set where the AI system processes the remaining 10 percent of incomplete song projects/music items from the complete/incomplete song projects and provides proposals for audio loops to generate complete music item and the quality of this audio loop suggestion and the complete music item is then accessed. The quality might be either measured by a human (e.g., an administrator of the AI system that monitors the quality of the recommendations of the AI system) or by an analysis of the output music item in comparison to the complete counterpart, the complete existing version of the processed incomplete music item. That is, the AI system generates an output music item that is "new" and different from the existing complete music item and the quality of this "new" output music item is being rated—to essentially rate the current efficiency of the AI system. The rating is preferably not stored since the data that is generated during the learning and validation phase is only generated to strengthen the effectiveness of the AI system when providing its functionality to the user.

The run through of the learning and validation steps will be a recurring process to increase the quality of the AI system. Of course, if the error value is determined to be acceptable, the AI system will be ready for use by the user. However, if the error is determined to be unacceptable it may be necessary to apply further filtering to the learning data set, or obtain additional complete song projects/music items, etc., before the AI system is ready for use. Those of ordinary skill in the art will understand how to evaluate the error value and whether or not it is acceptable for a given situation. In some cases, a predetermined error threshold will be established and if the calculated error value is not less than the predetermined error threshold additional steps will need to be taken to improve the quality of the learning dataset before allowing the user to access it.

The user interaction within the music item building phase 535 will begin by initiating an analysis of user provided audio loops 540, the user loops preferably provided as part of a seed song part and being unknown to the AI system. The available user generated song part and the therewith associated user audio loops will be transferred from the user computer system to the AI system as a user data set containing the user audio loops. The AI system will create a project file. This project file will be utilized throughout the building process by the AI system.

In a next preferred step, the BPM (beats per minutes) value of each of the transferred user audio loops will be determined 542 and a best fitting BPM value selected. The goal of this step is to minimize the distortion in the user audio loops via time stretching in order to get the loops all to the same BPM before they are incorporated into a music part. See, for example, the simultaneously played loops of FIG. 2. The determination can either be carried out by utilizing a BPM value stored in the metadata of the audio loop, if that is available, or it could be calculated as an estimate from the sample length of the audio loops. In many cases, a range between 80 and 160 BPM might be desired, where the calculated BPM satisfies the relationship BPM=sample rate/sample length*240. If the BPM is below 80, then it will preferably be multiplied by 2. This process will be carried out for each of the user loops and the best fitting BPM value will then be determined. This is, in some embodiments, achieved via statistical clustering or by calculating an average BPM value. The determined best BPM value will then be stored, for example, in the project file.

The AI system will then run an analysis on the user's audio loops and determine the data values for the, in some cases, roughly 200 low level/fundamental audio parameters associated with each loop. As is the case with the audio loops stored in the audio loop database, the data values will then be composited into a smaller number, by utilizing PCA or LDA, to produce the, preferably, at least eight distinct feature values, that describe a position of the audio loops in multi-dimensional space 544. The summary data values of the user audio loops will also be stored in the project file.

As a result, and as a next preferred step, based on this analysis the AI system will generate a song structure corresponding to the requirements of a complete music item 545. The structure of the music item might be similar to that displayed in FIG. 3. Of course, this structure might be modified, or not, by imposing additional restrictions on the music item including, for example, that it must contain one or more of an intro, verse, chorus, bridge, outro, etc. Additionally, the summary parameter values associated with each of the user audio loops will be read from the project file. These values will be used in conjunction with the data obtained by the AI system in the training phase to create a complete music item in a subsequent step.

The data from the user's seed part and the user audio loops will typically take the form of a list of the individual numerical values that are associated with each user loop in each channel/track of the song part of the incomplete song project/music item 550. The instant invention then will determine data values in the multi-dimensional space that resemble potential content for the song structure, wherein in the next step the instant invention will utilize these data values with a multi-dimensional distance measure (e.g. Euclidean distance in 8 dimensional space) to select the best fitting audio loops that correspond to the determined data values. These audio loops can be additional loops from the database or from the transferred user loop set which are then selected for insertion into the generated song structure 560 until a complete music item is obtained.

Figure 6:
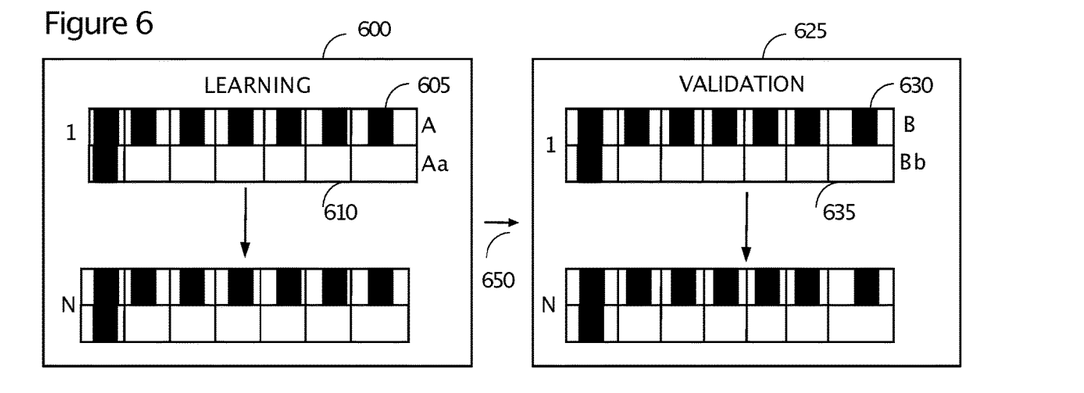
FIG. 6 depicts the elements of the learning phase of the instant invention.

Turning next to FIG. 6, this figure illustrates an embodiment of the learning 600 and validation 625 phase of the AI system of the instant invention in more detail. In the learning part the AI system will be supplied with the data from a number of complete song projects/music items. That is, the AI system is provided with data values from complete music items stored in the music item database, with the data values preferably being the summary values for each audio loop stored in the completed music items and data corresponding to the structure of the music item as discussed previously. Additionally, information such as the music item runtime, song part number, and other things that might be associated with a complete song project/music item 605 might be determined. A filtering mechanism will filter out song projects/music items whose song structure and associated loop selection does not meet predetermined criteria as discussed previously. The remaining songs projects/music items after filtering constitute a data set for use in the learning phase.

Next, one or more song parts will be extracted from the complete song projects/music items leaving an incomplete version of that music item. At least one song part will need to be left in the incomplete version so the extraction must remove fewer than all of the song parts of the completed music item. This operation will result in pairs of complete and incomplete song projects/music items. These pairs are then divided into a learning data set and a validation data set as discussed previously. How this might be done in practice was described in some detail supra.

The filtered learning data set will preferably correspond to a subset of about 90 percent of the pairs of complete and incomplete song projects/music items, which will then be utilized in the learning part of the training process. In this step, the AI will utilize the available, gathered and generated data from the database of the available audio loops and the data from the complete song projects/music items and it will learn how an incomplete song project/music item may be developed into a complete song project/music item. That is, the AI system will learn what is necessary in terms of song structure, audio loop selection and arrangement to evolve from an initial incomplete song project/music item to a satisfying complete song project/music item.

In this learning step, this process is carried out for all pairs of the selected subset of incomplete and complete song projects/music items. In a next step 650 the AI system is validating the learned structure and selection principles with the validation data set, wherein the validation phase comprises of "completing" the generated incomplete song projects/music items by providing audio loop suggestions for the individual parts of the remaining, e.g., 10 percent of incomplete song projects/music items. Afterwards the suggestions are measured in view of the actually selected audio loops in the complete song project/music item counterpart of the pair of incomplete/complete song projects/music items. According to one embodiment, the quality measurement could be performed by a human. In that case, that individual would provide, for example, a simple thumbs up or thumbs down rating, or a numerical rating (e.g., 1-10), etc. A measure of quality could also be obtained via an analysis of the output music item in comparison to the existing complete counterpart of the incomplete music item. So in essence, during the learning phase the AI might learn from a combination of complete—incomplete song projects/music items and in the validation phase this knowledge will be put to use, with the AI utilizing the incomplete part of the complete/incomplete song projects/music items data set and filling these incomplete song projects/music items with data value suggestions representing audio loops to form a complete music item. Then, the created music item will be compared with the actual complete version of that incomplete/complete pair to evaluate the quality of the suggestion and ultimately the progress of the learning process.

Figure 7:
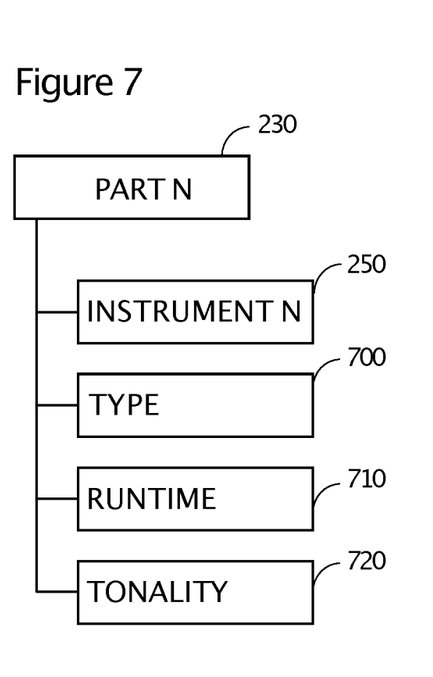
FIG. 7 depicts the structure and data layout of the parts of a song structure for a particular embodiment.

Turning next to FIG. 7, this figure illustrates one possible structural configuration of the parts of the song structure according to an embodiment. Each song structure comprises a plurality of individual parts N 230, which might include a plurality of instruments 250 being associated to these parts, with these instruments being musically represented by the audio loops. Additionally, some parts have a specific type 700 associated with them. Examples of the "type" parameter would be intro, outro, variation, etc. Further, each part will preferably have an associated runtime 710, this runtime might be 4 or 8 measures or a multiple thereof. The runtime might be also defined by the user or preset by the AI system as part of the suggested song structure. Also, each part will preferably have information stored that describes its tonality 720. Examples of tonality include information about the particular key of the part, whether it is in a major or minor key, the chord changes (if any) that occur in the part, etc.

Of course, many modifications and extensions could be made to the instant invention by those of ordinary skill in the art. For example in one preferred embodiment the instant invention might be utilized for the recommendation of individual audio loops for individual parts, allowing the user to accompany the music item creation process by preferably allowing or denying the insertion of the recommended audio loop. In another embodiment the instant invention might allow the user to apply different weights to the audio parameters delivered by the analysis of each audio loops, therewith allowing the user to enhance the variation of the potential outcome. Additionally in another embodiment it might be possible to not have to rely on incomplete song projects/music items containing at least one song part, instead it might be possible to allow the user to communicate properties, tags of a desired song to therewith initiate the song creation process from that information. Furthermore, in another embodiment it might be possible to utilize an existing song as the starting point for the instant invention and generate a similar new song.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of constructing a digital music item, comprising the steps of:
   (a) requiring a user to create a seed part comprising a selection by the user of a plurality of user provided audio loops;
   (b) accessing a music item database, said music item database comprising a plurality of completed music items, each of said completed music items comprising a plurality of song parts;
   (c) filtering said plurality of completed music items in said music item database to select a first subset of said completed music items;
   (d) for each of said completed music items in said first subset, creating an associated incomplete music item by selecting fewer than all of said song parts of said completed music item, thereby creating a same number of incomplete music items as a number of completed music items in said first subset, said same number of incomplete music items taken together comprising a learning dataset;
   (e) training an artificial intelligence program using said learning dataset together with said first subset of completed music items by performing a pairwise analysis of a selected incomplete music item and a corresponding complete music item for each incomplete music item in said learning dataset;
   (f) using said trained artificial intelligence program and said created seed part to construct said digital music item; and
   (g) performing at least a portion of said digital music item for the user.

2. The method according to claim 1, wherein step (e) comprises the steps of:

(e1) training an artificial intelligence program using said learning dataset of incomplete music items together with said first subset of completed music items by performing a pairwise analysis of a selected incomplete music item and a corresponding complete music item for each incomplete music item in said learning dataset, thereby providing a trained artificial intelligence program;

(e2) for each of said complete music items and said incomplete music item pairs used in said pairwise analysis, using said trained artificial intelligence program and said incomplete music item in said music item pair to produce generated complete music items;

(e3) comparing each of said generated complete music items with said corresponding complete music item to determine a training error value of said trained artificial intelligence program;

(e4) continuing to perform steps (e1) to (e3) until said training error value is less than a predetermined value;

(e5) selecting a second subset of said music item database different from said first subset of said completed music items, thereby creating a validation dataset;

(e6) for each of said complete music items in said validation dataset, creating an associated incomplete validation music item by selecting fewer than all parts of each of said music items in said validation dataset; and (e7) using said trained artificial intelligence program and each of said incomplete validation music items in said music item dataset to construct a validation music item for each of said incomplete validation music items; and (e8) comparing each of said constructed validation music item with the corresponding music item in said validation dataset to determine a quality of said trained artificial intelligence program.

3. A method of constructing a digital music item, comprising the steps of:

(a) obtaining a selection of two or more audio loops from a user, thereby obtaining a plurality of user provided audio loops;

(b) accessing said user provided audio loops by an artificial intelligence program;

(c) determining a best fitting BPM (beats per minute) value for use with said user provided audio loops;

(d) adjusting each of said user provided audio loops to have the best fitting BPM;

(e) initiating an analysis of each of said user provided audio loops, thereby generating a plurality of summary data values for each of said user adjusted audio loops;

(f) accessing an audio loop database, said audio loop database comprising a plurality of database audio loops;

(g) initiating an analysis of each of said plurality of database audio loops, thereby generating a plurality of summary data values for each of said database audio loops;

(h) accessing a music item database comprising a plurality of complete music items, wherein each of said plurality of complete music items comprises a plurality of song parts, each of said song parts comprises a plurality of song part audio loops;

(i) selecting a subset of said complete music items in said music item database, thereby selecting a learning dataset comprised of a plurality of music items;

(j) for each of said selected music items in said learning dataset, creating an associated incomplete music item by extracting fewer than all parts from each of said selected music items;

(k) training an artificial intelligence program using said complete music items in said learning dataset and said associated incomplete music items associated with each of said selected music items;

(l) using said trained artificial intelligence program and said plurality of user provided adjusted audio loops to construct said digital music item; and (m) performing at least a portion of said digital music item for the user.

4. The method of claim 3, wherein step (c) comprises the step of:

(c1) determining a sample length of each of said user provided audio loops;

(c2) estimating an individual BPM value for each of said user provided audio loops utilizing the determined sample length and a sample rate of each of said user provided audio loops; and (c3) using a clustering or averaging algorithm and said estimated individual BPM values of each of said user provided audio loops to determine a best fitting BPM value.

5. The method of claim 3, wherein step (e) comprises the step of:

(e1) initiating an analysis of each of said user provided audio loops to determine a plurality of fundamental audio values for each of said user provided adjusted audio loops;

(e2) analyzing said plurality of fundamental audio values for all of said user provided audio loops using principal component analysis or linear discriminant analysis to produce an n-dimensional coordinate space, where n is a number of coordinates; and (e3) using said n-dimensional coordinate space to obtain n summary data values for each of said selected user provided audio loops.

6. The method of claim 3, wherein step (e) comprises the step of:

(e1) analyzing each of said plurality of audio loops stored in said audio loop database, thereby generating a plurality of fundamental data values for each of said plurality of audio loops so analyzed;

(e2) analyzing said fundamental data values of said analysed audio loops stored in said audio loop database using principal component analysis or linear discriminant analysis to produce an n-dimensional coordinate space, where n is a number of coordinates, and (e3) obtaining n summary data values for each of said plurality of audio loops analyzed in said audio loop database.

7. The method according to claim 3, wherein step (k) comprises the steps of:

(k1) training an artificial intelligence program using each of said complete music items in said learning dataset and each of said associated incomplete music items associated therewith, (k2) using said trained artificial intelligence program to construct from each of said incomplete music items a complete constructed music item;

(k3) comparing each of said complete constructed music items with a corresponding complete music item to determine a training error value of said trained artificial intelligence program;

(k4) selecting a subset of said music item database different from said learning dataset, thereby creating a validation dataset;

(k5) for each of said complete music items in said validation dataset, creating an associated incomplete validation music item by extracting fewer than all song parts of each of said music items in said validation dataset; and (k6) using said trained artificial intelligence program and each of said incomplete validation music items to construct a corresponding constructed validation music item for each of said incomplete validation music items; and (k7) comparing each of said constructed corresponding validation music items with an associated complete music item in said validation dataset to determine a quality of said trained artificial intelligence program; and wherein step (l) comprises the step of:

(l1) only if said training error value is above a predetermined value, using said trained artificial intelligence program and said plurality of user provided adjusted audio loops to construct said digital music item.

8. The method of claim 5, wherein step (l) comprises the step of:

(l1) determining a song structure of said digital music item, wherein said song structure comprises at least one song part, each of said at least one song part containing at least one audio loop;

(l2) using said trained artificial intelligence program, said generated plurality of summarized data values representing each of said selected user provided audio loops and said determined best fitting BPM value to construct said digital music item by performing the steps of:

(i) obtaining summarized data values representing audio loops in said n-dimensional space for each of said song parts of the determined song structure;

(ii) using said summarized data values to determine a distance in n-dimensional space between said user provided audio loops and a plurality of audio loops in said audio loop database;

(iii) selecting one of more proximate audio loops in said audio loop database based on said determined distance in n-dimensional space between said selected one or more proximate audio loops and said user provided audio loops; and (iv) inserting said proximate audio loops into the at least one song part of the determined song structure, thereby constructing said music item.

9. The method according to claim 5, wherein n is greater than or equal to 8.

10. The method according to claim 6, wherein n is greater than or equal to 8.

* * * * *